US011847523B2

(12) United States Patent
Wang et al.

(10) Patent No.: US 11,847,523 B2
(45) Date of Patent: Dec. 19, 2023

(54) METHODS AND DEVICES FOR IMPROVING INDICIA DECODING WITH AN IMAGING DEVICE

(71) Applicant: ZEBRA TECHNOLOGIES CORPORATION, Lincolnshire, IL (US)

(72) Inventors: Dayou Wang, Mount Sinai, NY (US); Michelle X. Wang, Mount Sinai, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 85 days.

(21) Appl. No.: 17/575,401

(22) Filed: Jan. 13, 2022

(65) Prior Publication Data

US 2023/0222304 A1 Jul. 13, 2023

(51) Int. Cl.
G06K 7/14 (2006.01)
G01S 17/10 (2020.01)
G06F 3/14 (2006.01)

(52) U.S. Cl.
CPC ............ *G06K 7/1413* (2013.01); *G01S 17/10* (2013.01); *G06F 3/14* (2013.01)

(58) Field of Classification Search
None
See application file for complete search history.

(56) References Cited

U.S. PATENT DOCUMENTS

| 2006/0013435 | A1* | 1/2006 | Rhoads | G06T 1/005 |
| | | | | 382/100 |
| 2020/0302135 | A1* | 9/2020 | Nirmala | G06K 7/1413 |
| 2021/0112154 | A1* | 4/2021 | Rodriguez | G10L 15/22 |

OTHER PUBLICATIONS

International Search Report and Written Opinion for International Application No. PCT/US2023/10574 dated Apr. 13, 2023.

* cited by examiner

*Primary Examiner* — Kristy A Haupt
(74) *Attorney, Agent, or Firm* — Yuri Astvatsaturov (57) ABSTRACT

Methods and devices for improving indicia decoding with an imaging device are disclosed herein. An example method includes: (a) searching, by an imaging device, a search region within a current image for an indicia, wherein the search region includes a plurality of search seeds; (b) attempting, by the imaging device, to decode the indicia within the search region by analyzing image data corresponding to each seed of the plurality of search seeds; (c) responsive to not decoding the indicia, capturing, by the imaging device, a subsequent image featuring the indicia; (d) adjusting, by the imaging device, the search region based on a distance between the imaging device and the indicia featured in the subsequent image; (e) designating the subsequent image as the current image; and (f) iteratively performing (a)-(f) until the imaging device decodes the indicia.

20 Claims, 7 Drawing Sheets

(Prior Art)

METHODS AND DEVICES FOR IMPROVING INDICIA DECODING WITH AN IMAGING DEVICE

BACKGROUND

Barcode scanning devices have provided reliable product identification and tracking in many industries for decades. While such conventional scanning devices are capable of detecting and decoding indicia at short distances, these capabilities suffer as the distance of the indicia from the device increases and the relative size of the indicia within the image decreases. Namely, these conventional scanning devices may generally be capable of detecting and decoding indicia of a certain relative size within a captured image, but relatively small indicia may not always be detected and decoded. Users of these scanning devices may hold the device at a variety of distances when attempting to detect and decode an indicia, and as a result, may place the indicia far enough from the device that the indicia is too small within the captured image for the device to successfully detect and decode it. As a result, users may unintentionally fail to scan an indicia, as the device may be unable to detect and decode the indicia, despite being within the scannable range of the device.

Failing to detect and decode indicia can result in unidentified products and products that are not tracked as part of shipments, leading to delayed or missing shipments. Moreover, the conventional indicia scanning device may occupy significant amounts of processing resources and time when searching a relatively large search region for the small indicia. When the conventional indicia scanning device fails to detect and decode the indicia, subsequent images may be required, and the search process may begin again, thereby further wasting precious processing resources and time. Overall, failing to detect and decode indicia reduces efficiency and increases the time required to resolve issues related to products that have not been identified/tracked through successful indicia detection and decoding.

Accordingly, there is a need for methods and devices for improving indicia decoding with an imaging device.

SUMMARY

In one embodiment, the present invention is a method for improving indicia decoding with an imaging device. The method comprises: (a) searching, by an imaging device, a search region within a current image for an indicia, wherein the search region includes a plurality of search seeds; (b) attempting, by the imaging device, to decode the indicia within the search region by analyzing image data corresponding to each seed of the plurality of search seeds; (c) responsive to not decoding the indicia, capturing, by the imaging device, a subsequent image featuring the indicia; (d) adjusting, by the imaging device, the search region based on a distance between the imaging device and the indicia featured in the subsequent image; (e) designating the subsequent image as the current image; and (f) iteratively performing (a)-(f) until the imaging device decodes the indicia.

In a variation of this embodiment, adjusting the search region further includes reducing or increasing an area of the search region based on the distance.

In another variation of this embodiment, adjusting the search region further includes increasing or decreasing a number of search seeds within the search region based on the distance.

In yet another variation of this embodiment, a center of an aiming indicator is disposed in a center of the search region and the indicia is presumed to be at the center of the aiming indicator.

In still another variation of this embodiment, the indicia is a barcode, and the method further comprises: attempting to decode the barcode within the search region by applying a decoding algorithm to the image data from each seed.

In yet another variation of this embodiment, after each iteration, the imaging device increases an iteration index, and the method further comprises: (f) iteratively performing (a)-(f) until the imaging device decodes the indicia or at least one of (i) the imaging device determines that the iteration index exceeds an iteration index threshold, (ii) the imaging device determines that a decoding time corresponding to the current image exceeds a decoding time threshold, or (iii) the image data from each seed in the plurality of search seeds is analyzed without detecting the indicia. Further in this variation, and responsive to the imaging device determining that the iteration index exceeds the iteration index threshold, the decoding time exceeds the decoding time threshold, or the image data is analyzed without detecting the indicia, the method further comprises: displaying, by the imaging device, a message to a user requesting another image featuring the indicia.

In still another variation of this embodiment, each seed of the plurality of search seeds is randomly placed within the search region.

In another embodiment, the present invention is an imaging device for improving indicia decoding. The device comprises: an imaging assembly configured to capture a current image featuring an indicia, the current image comprising a set of image data; one or more processors; and a non-transitory computer-readable memory coupled to the imaging assembly and the one or more processors, the memory storing instructions thereon that, when executed by the one or more processors, cause the one or more processors to: (a) search a search region within the image for the indicia, wherein the search region includes a plurality of search seeds, (b) attempt to decode the indicia within the search region by analyzing image data from the set of image data that corresponds to each seed of the plurality of search seeds, (c) responsive to not decoding the indicia, cause the imaging assembly to capture a subsequent image featuring the indicia, (d) adjust the search region based on a distance between the imaging device and the indicia featured in the subsequent image, (e) designate the subsequent image as the current image, and (f) iteratively perform (a)-(f) until the indicia is decoded.

In a variation of this embodiment, the instructions, when executed by the one or more processors, further cause the one or more processors to: adjust the search region by reducing or increasing an area of the search region based on the distance.

In another variation of this embodiment, the instructions, when executed by the one or more processors, further cause the one or more processors to: adjust the search region by increasing or decreasing a number of search seeds within the search region based on the distance.

In yet another variation of this embodiment, the imaging device further comprises: a distance calculator configured to calculate the distance between the imaging device and the indicia based on an aiming indicator that is centered on the indicia.

In still another variation of this embodiment, the indicia is a barcode, and the instructions, when executed by the one or more processors, further cause the one or more processors to: attempt to decode the barcode within the search region by applying a decoding algorithm to the image data corresponding to each seed.

In yet another variation of this embodiment, after each iteration, the one or more processors increase an iteration index, and the instructions, when executed by the one or more processors, further cause the one or more processors to: (f) iteratively perform (a)-(f) until the indicia is decoded or at least one of (i) the one or more processors determine that the iteration index exceeds an iteration index threshold, (ii) the one or more processors determine that a decoding time corresponding to the current image exceeds a decoding time threshold, or (iii) the image data from each seed in the plurality of search seeds is analyzed without detecting the indicia. Further in this variation, the instructions, when executed by the one or more processors, further cause the one or more processors to: responsive to determining that the iteration index exceeds the iteration index threshold, the decoding time exceeds the decoding time threshold, or the image data is analyzed without detecting the indicia, display a message to a user requesting another image featuring the indicia.

In yet another embodiment, the present invention is a tangible machine-readable medium comprising instructions for improving indicia decoding, when executed, cause a machine to at least: A tangible machine-readable medium comprising instructions for improving indicia decoding, when executed, cause a machine to at least: (a) search a search region within a current image for an indicia, wherein the search region includes a plurality of search seeds; (b) attempt to decode the indicia within the search region by analyzing image data that corresponds to each seed of the plurality of search seeds; (c) responsive to not decoding the indicia, capture a subsequent image featuring the indicia; (d) adjust the search region based on a distance from the indicia featured in the subsequent image; (e) designate the subsequent image as the current image; and (f) iteratively perform (a)-(f) until the indicia is decoded.

In a variation of this embodiment, the instructions, when executed, further cause the machine to at least: adjust the search region by reducing or increasing an area of the search region based on the distance.

In another variation of this embodiment, the instructions, when executed, further cause the machine to at least: adjust the search region by increasing or decreasing a number of search seeds within the search region based on the distance.

In yet another variation of this embodiment, the indicia is a barcode, and the instructions, when executed, further cause the machine to at least: attempt to decode the barcode within the search region by applying a decoding algorithm to the image data corresponding to each seed.

In still another variation of this embodiment, after each iteration, the instructions, when executed, further cause the machine to at least increase an iteration index, and: (f) iteratively perform (a)-(f) until the indicia is decoded or at least one of (i) the iteration index exceeds an iteration index threshold, (ii) a decoding time corresponding to the current image exceeds a decoding time threshold, or (iii) the image data from each seed in the plurality of search seeds is analyzed without detecting the indicia; and responsive to determining that the iteration index exceeds the iteration index threshold, the decoding time exceeds the decoding time threshold, or the image data is analyzed without detecting the indicia, display a message to a user requesting another image featuring the indicia.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, users of imaging devices configured to detect and decode scannable indicia desire that the imaging devices successfully detect and decode scannable indicia at any suitable range from the device. When an indicia is far from the scanning device, it appears small in the captured image, and correspondingly occupies a small portion of the search region. Conventional indicia scanning devices search over a relatively large search region for such a small indicia, thereby wasting substantial amounts of time. To further complicate matters, when the indicia itself is relatively small (e.g., small barcodes), then conventional indicia scanning devices struggle considerably to detect them due to the significantly decreased probability of detection relative to larger indicia. Accordingly, conventional indicia scanning devices suffer from a lack of consistent, reliable indicia detection and decoding capabilities when the indicia occupies a relatively small portion of the captured image.

The methods/device of the present disclosure provide solutions to this indicia detection and decoding problem associated with traditional scanning devices. Namely, the methods/devices of the present disclosure alleviate these problems associated with traditional scanning devices by introducing an adjustable search region within images captured by an imaging device. The search region may include a plurality of search seeds that each include data that may enable the imaging device to detect and decode an indicia. If the imaging device is initially unsuccessful when attempting to detect/decode the indicia featured in an image, the imaging device may iteratively capture a subsequent image and adjust the search region based on a distance between the imaging device and the indicia featured in the subsequent image until the imaging device successfully decodes the indicia. Generally speaking, the search seeds may correspond to areas within a captured image (e.g., 5 pixels by 5 pixels) that include image data to be analyzed by an indicia decoder. In some instances, the image data contained within an area represented by a search seed may include image data associated with an indicia represented within the captured image. Thus, by analyzing the image data corresponding to each search seed, the imaging device may detect and decode the indicia represented within the captured image.

As a result, the methods/devices of the present disclosure generally improve the successful detection and decoding rates of indicia by imaging devices. These improvements may result in a significant reduction in the number of unidentified products and products that are not tracked as part of shipments, resulting in fewer delayed or missing shipments. Thus, the methods/devices of the present disclosure may generally increase efficiency and decrease the overall time required to resolve issues related to products that have not been identified/tracked through successful indicia detection and decoding.

Figure 1:
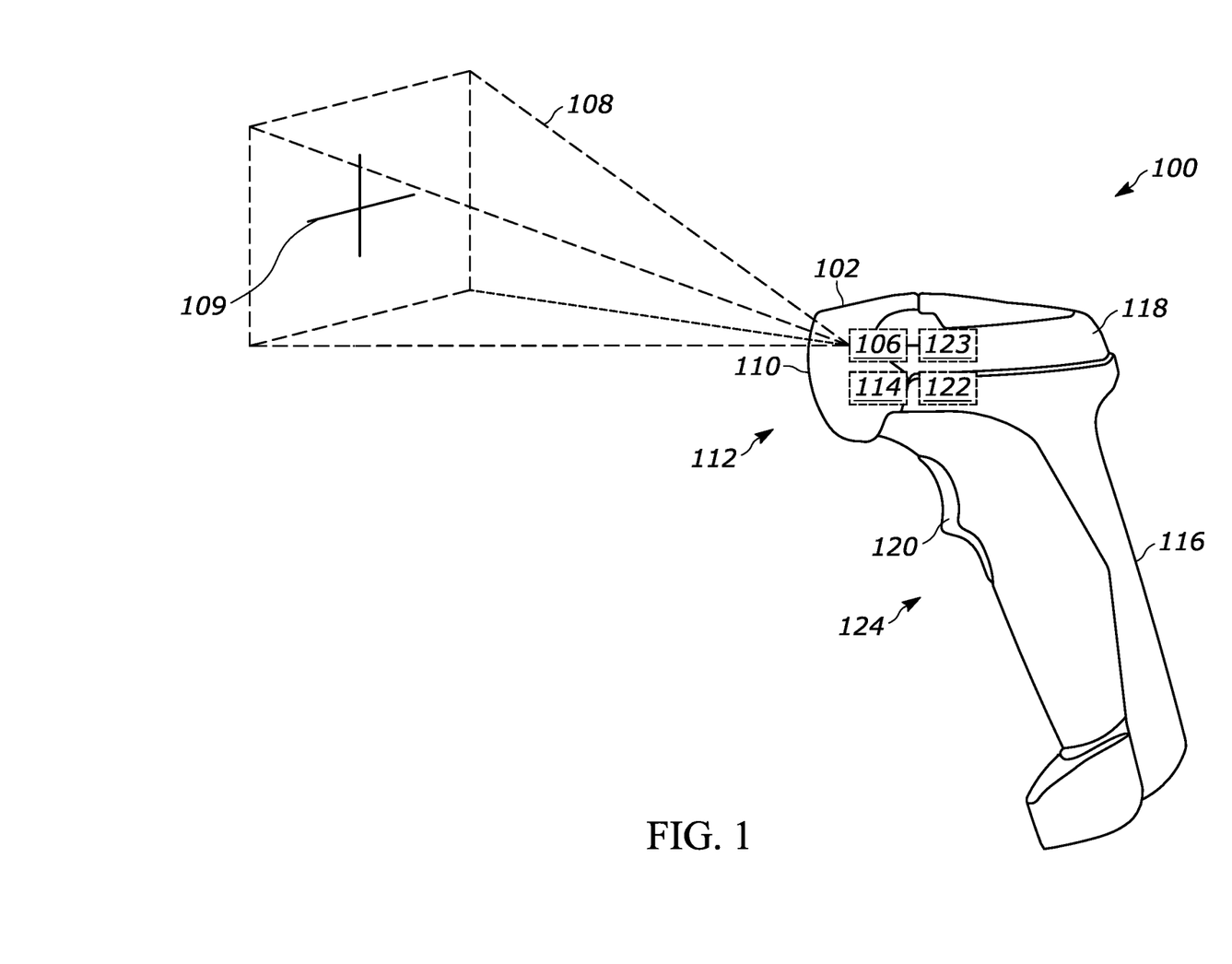
FIG. 1 is a perspective view of an example imaging device, in accordance with various embodiments of the present invention.

Referring now to the drawings, FIG. 1 is a perspective view 100 of an example imaging device 100, in accordance with various embodiments of the present invention. The example imaging device 100 includes an example housing 102 in which an imaging assembly 106 is disposed. The imaging assembly 106 captures image data representing a target in a field of view (FOV) 108 at least partially defined by a front-facing opening or window 110 (also referenced herein as an "optical window") on a front side 112 of the example imaging device 100. The example imaging device 100 includes an indicia decoder 114 in communication with the imaging assembly 106, and configured to receive the image data and detect/decode an indicia captured in the image data.

The example housing 102 of FIG. 1 includes a generally elongated handle or lower handgrip portion 116, and an upper body portion 118 having the front side 112 at which the front-facing opening or window 110 is located. The cross-sectional dimensions and overall size of the handgrip portion 116 are such that the example imaging device 100 can be conveniently held in an operator's hand during operation. The front-facing opening or window 110 is configured to face generally away from a user when the user has the example imaging device 100 in a handheld position. The portions 116 and 118 may be constructed of a lightweight, resilient, shock-resistant, self-supporting material, such as a synthetic plastic material. The housing 102 may be injection molded, but can also be vacuum-formed or blow-molded to form a thin hollow shell which bounds an interior space whose volume is sufficient to contain the various components of the handheld scanner 100. Although the housing 102 is illustrated as a portable, point-of-transaction, gun-shaped, handheld housing, any other configuration including a hands-free configuration could be used.

A manually actuatable trigger 120 is mounted in a moving relationship on the handgrip portion 116 in a forward facing region 124 of the handgrip portion 116. An operator's finger can be used to actuate (e.g., depress) the trigger 120 once a target falls within the imaging field of view 108 to cause the imaging assembly 106 to capture an image of the target. As a result of actuating the trigger 120, the example imaging device 100 may generate an aiming indicator 109. The aiming indicator 109 may visually indicate the FOV 108 of the example imaging device 100 for the operator utilizing the device 100, and may more specifically indicate a region within the FOV 108 where the device 100 may successfully detect/decode and/or otherwise interpret an indicia within the FOV 108. As such, the aiming indicator 109 may generally guide an operator to place an indicia in the correct location within the FOV 108 to optimize the likelihood of successful detection and decoding of the indicia by the indicia decoder 114. Moreover, as discussed herein, the aiming indicator 109 may be utilized by the distance calculator 123 in order to calculate distances between the imaging device 100 and the indicia. These distances may then be used on an image-by-image basis to determine how the search region generator 122 should adjust the search region to increase the likelihood of successful indicia detection/decoding without unnecessarily increasing the overall processing burden of the imaging device 100.

Accordingly, the example imaging device 100 may include a search region generator 122 that is configured to generate and update/adjust an area around a center of the aiming indicator 109 (also referenced herein as a "search region") as well as generating search seeds (not shown) within the search region to enable the indicia decoder 114 to detect and decode an indicia (not shown) within the portion of the FOV 108 defined by the indicator 109. Generally, the search region generator 122 may designate a region around the aiming indicator 109 as the search region, which the generator 122 may then randomly populate with search seeds. If the image data contained in the areas of the search region represented by the search seeds are insufficient to detect and/or decode an indicia featured in a captured image, then the search region generator 122 may iteratively capture subsequent images and update/adjust the size of the search region and/or the search seed density within the search region based on a distance between the imaging device 100 and the indicia featured in the subsequent images (e.g., as calculated by the distance calculator 123), in order to ensure a successful detection and decoding of the indicia featured within the captured images (e.g., an initial captured image and any subsequent images featuring the indicia).

To illustrate, assume that the imaging device 100 captured an image featuring an indicia, the search region generator 122 generated a search region with multiple search seeds, but the indicia decoder 114 was unable to detect and/or decode the indicia utilizing the image data from the search seeds within the search region. In this example, the imaging device 100 may capture a subsequent image featuring the indicia, and the distance calculator 123 may determine a distance from the imaging device 100 to the indicia featured in the subsequent image. As part of calculating the distance to the indicia in the subsequent image, the distance calculator 123 may determine that the imaging device 100 was relatively further from the indicia (e.g., far from the target object featuring the indicia in the captured image) than the imaging device was in the prior image, from which, the indicia was not successfully decoded.

Continuing the prior example, and as one example in this circumstance, the search region generator 122 may reduce the size of the search region corresponding to the subsequent image relative to the size of the search region in the prior image, and may simultaneously generate more search seeds within the smaller search region in order to more densely populate the search region with search seeds, thereby increasing the likelihood of a successful indicia detection and decoding. As another example, the search region generator 122 may simply reduce the size of the search region without increasing the number of search seeds generated within the search region, and as a result, may still increase the search seed density within the smaller search region relative to the prior, larger search region of the prior image that the generator 122 initially generated.

In certain instances, the search region in which the search region generator 122 generates search seeds may be identical to the area within the FOV 108 defined by the aiming indicator 109, and/or may be any suitable size relative to the aiming indicator 109. Moreover, the search region and/or the search seeds generated by the search region generator 122 may not be visually displayed to a user as a result of actuating the trigger 120.

In some aspects, the imaging device 100 may include a search seed generation function (also referenced herein as a "Picklist" function) in order to enable the search region generator 122 to generate search seeds. When an operator selects/enables the Picklist function, the imaging device 100 may activate the search region generator 122 to generate search seeds within the search region of a captured image, where the center of the aiming indicator 109 may define the center of the search region, upon operator actuation of the trigger 120. For example, the Picklist function may be a selectable option from a list of selectable options provided to an operator at the imaging device 100, and/or the Picklist function may be associated with a button, switch, and/or any other physically actuatable object located on the imaging device 100.

In certain aspects, the search region generator 122 may randomly generate each search seed within the search region of the FOV 108 around the aiming indicator 109. The search region generator 122 may also randomly provide a particular search seed density within the search region in order to enable the indicia decoder 114 to detect and decode an indicia. Further, the search region generator 122 may generate different numbers/densities/placements of search seeds within the search region during a prolonged (e.g., continuous) actuation and/or during multiple successive actuations of the trigger 120 as part of an iterative process configured to detect and decode an indicia, as described herein. However, it should be appreciated that the search region generator 122 may generate search seeds in any suitable manner.

The imaging device 100 may also include a distance calculator 123 that is configured to determine a distance between the imaging device 100 and a target object. For example, the distance calculator 123 may utilize parallax measurements to determine the distance between the imaging device 100 and the target object. Any particular indicia may have well known and/or otherwise predefined dimensions, such that once an indicia is identified within an image, the distance calculator 123 may utilize these dimensions of the indicia located within the image to calculate the distance between the imaging device 100 and the target object based on parallax. In particular, as the target object, and by association, the indicia is moved further away from the imaging device 100, the perceived size of the indicia may decrease within the FOV 108. Thus, as a general description, the distance calculator 123 may determine the perceived dimensions of the indicia within the captured image, compare those perceived dimensions to the known dimensions of the indicia, and calculate a distance between the imaging device 100 and the target object.

As another example, the distance calculator 123 may measure the time taken for a pulse of light to travel from the imaging device 100 to the target object and then back to the imaging device 100. Additionally, or alternatively, the distance calculator 123 may utilize the aiming indicator 109 to measure the distance between the imaging device 100 and the target object containing the indicia presumed to be at the center of the aiming indicator 109. Regardless, the distance calculator 123 may perform these calculations upon actuation of the trigger 120 and/or at any other suitable time before, during, or after the capture of an image of the target object featuring an indicia.

In any event, once the operator has actuated the trigger 120, and the imaging device 100 has generated the aiming indicator 109, the operator may then adjust the orientation of the example imaging device 100 until the aiming indicator 109 is centered over an indicia included as part of the target. The example imaging device 100 may then capture image data of the target using the imaging assembly 106, the distance calculator 123 may determine a distance between the imaging device 100 and the indicia featured in the captured image, and the imaging device 100 may thereafter proceed to detect and decode any indicia included within the image by applying the indicia decoder 114 to the image data, and more specifically, to the image data included within the search seeds generated by the search region generator 122.

Figure 2A:
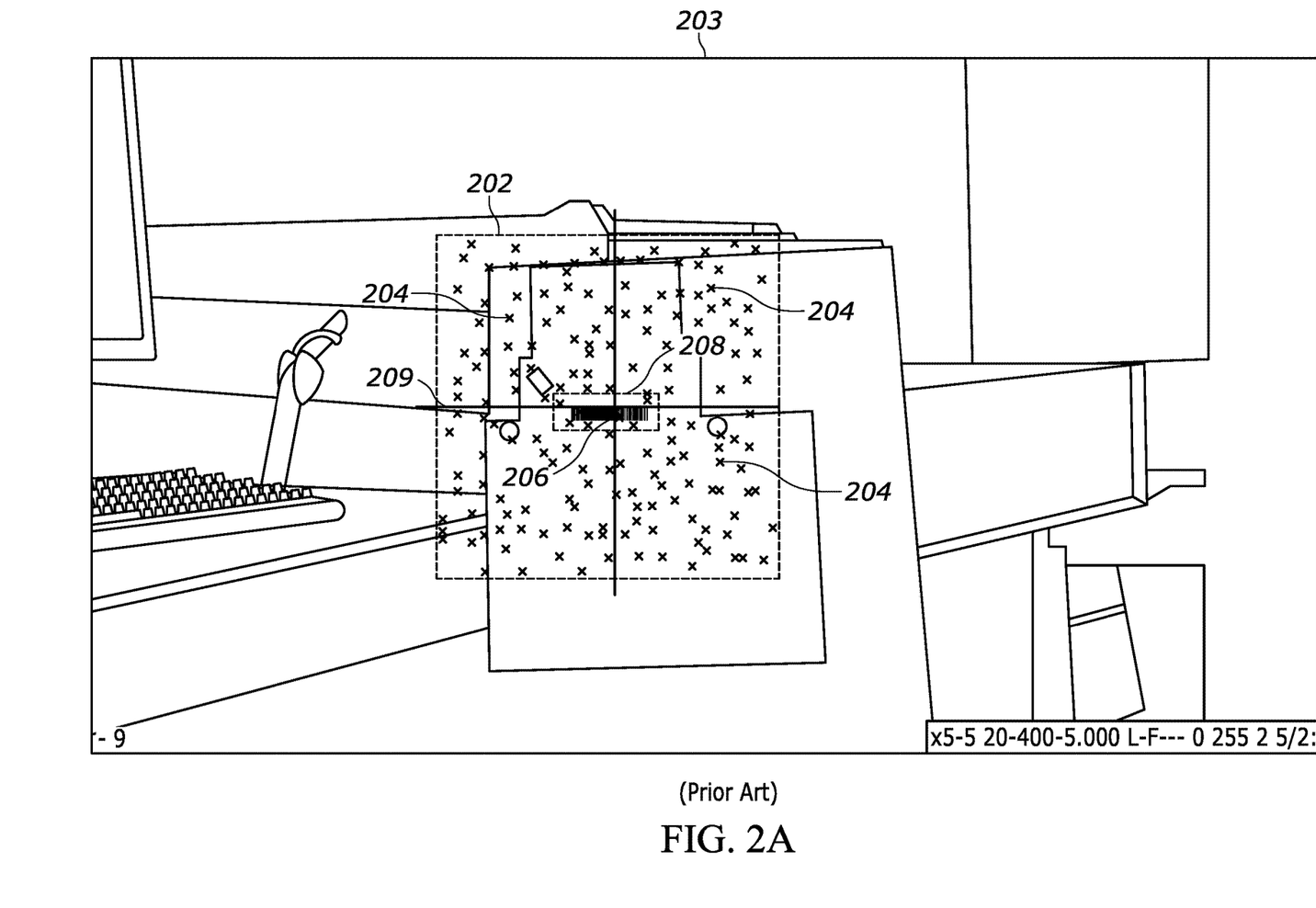
FIG. 2A illustrates an example prior art search region within a field of view (FOV) of an imaging device.

To provide a better understanding of the adaptive search region functionalities of the present disclosure, discussed in reference to FIG. 1, FIG. 2A illustrates an example prior art search region 202 within a FOV 203 of an imaging device. The example prior art search region 202 may be centered around an aiming indicator 209, and may include multiple search seeds 204. Each search seed 204 may generally correspond to a miniature region within the FOV 203 (and more particularly, within the example prior art search region 202) where the image data contained within each search seed 204 may include data associated with a truncated indicia 206. However, the search seeds 204 may not be visually generated as a result of an operator actuating a trigger, so it is to be appreciated that the image representing the FOV 203 in FIG. 2A may include the search seeds 204 after the imaging device has captured image data comprising the image.

Regardless, as illustrated in FIG. 2A, the example prior art search region 202 may include a random arrangement of search seeds 204. When the search seeds 204 are generated, the imaging device may analyze image data associated with each/some of the search seeds 204 in order to detect and/or decode the truncated indicia 206. However, the imaging device that captured this example prior art search region 202 does not include the distance calculator 123 and search seed generator 122 of FIG. 1, and as a result, the search seed density in the example prior art search region 202 is relatively low considering the small size of the indicia 206. Accordingly, such a low search seed density leads to a relatively low possibility of decoding the indicia 206 when compared to a search region with a comparatively higher search seed density (e.g., example search region 302).

The truncated indicia 206 may have a portion of the top, bottom, sides, middle, and/or any other suitable portion of the indicia 206 blocked and/or otherwise obscured within the FOV 108, such that the region occupied by the truncated indicia 206 within the FOV 108 may be relatively small. As a result, the truncated indicia 206 within the relatively large example prior art search region 202 can pose a problem for the prior art imaging device, because the number of search seeds 204 and the overall density of the search seeds 204 may be substantially sparse, such that the rate of successfully detecting and decoding the truncated indicia 206 is very low. In particular, a central search region portion 208 that includes the truncated indicia 206 illustrates how minimal the information available to the prior art imaging device may be within the relatively large example prior art search region 202.

Figure 2B:
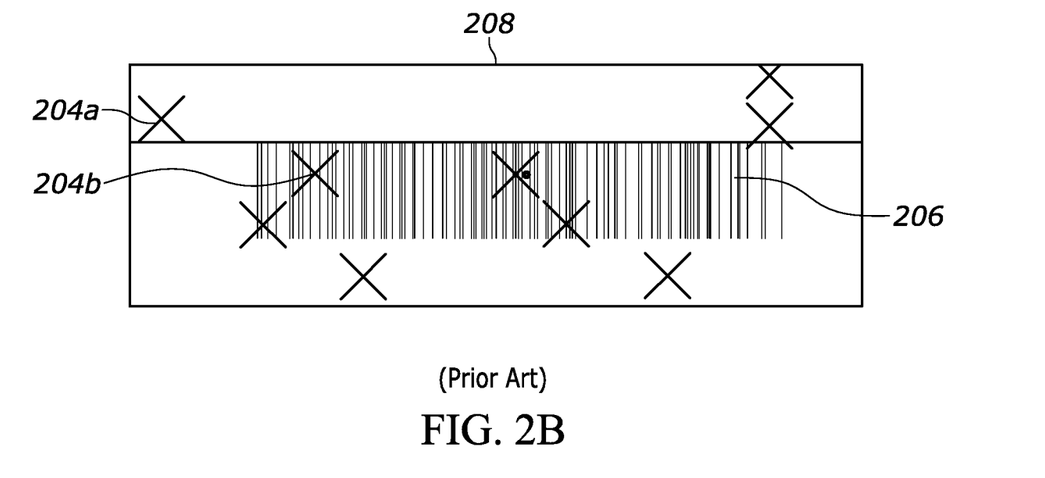
FIG. 2B illustrates a portion of the example prior art search region of FIG. 2A that is centered on the indicia.

FIG. 2B illustrates the central search region portion 208 in greater detail, and shows how only a few search seeds 204 are located on the truncated indicia 206. In fact, an overwhelming majority of the search seeds 204 failed to fall on the truncated indicia 206, such that these non-indicia seeds (referenced collectively as 204a) do not provide useable information to the prior art imaging device in order to detect or decode the truncated indicia 206. By contrast, the indicia seeds (referenced collectively as 204b) may provide useful image data corresponding to the truncated indicia 206, but the useful image data derived from the indicia seeds 204b may still be insufficient to accurately detect and/or decode the truncated indicia 206.

It should be appreciated that any single search seed that is located within and/or contacting an indicia in a captured image may provide sufficient image data for the imaging device 100 (e.g., indicia decoder 114) of FIG. 1 to successfully detect and/or decode the indicia. However, having only one or a few search seeds contacting an indicia featured in a captured image may generally be insufficient for a detection algorithm to accurately and reliably detect and decode the indicia. Accordingly, an effective method to ensure accurate and reliable detection and decoding using such a detection algorithm when the imaging device 100 is relatively far from the indicia is to adjust the search region by increasing/decreasing the size of the search region and/or increasing/decreasing the number of search seeds contacting and/or located within the indicia featured in the captured image.

Moreover, it should be understood that while most of the aspects described herein refer to adjusting the search region by decreasing the size of the search region and/or increasing the search seed density, the techniques of the present disclosure may also include adjusting the search region by increasing the size of the search region, decreasing the search seed density, and/or keeping one or both values fixed. For example, when the distance calculator 123 determines that the imaging device 100 is relatively closer to an indicia compared to a prior image capture, the search region generator 122 may adjust the search region by increasing the size of the search region and/or decreasing the search seed density. Additionally, if the distance calculator 123 determines that the imaging device 100 is at a relatively similar distance from the indicia compared to a prior image capture, the search region generator 122 may adjust the search region by keeping the size of the search region and/or the search seed density constant, and may proceed to generate a different random assortment of search seeds in order to potentially analyze more/better image data corresponding to the indicia to achieve successful detection/decoding.

Figure 3A:
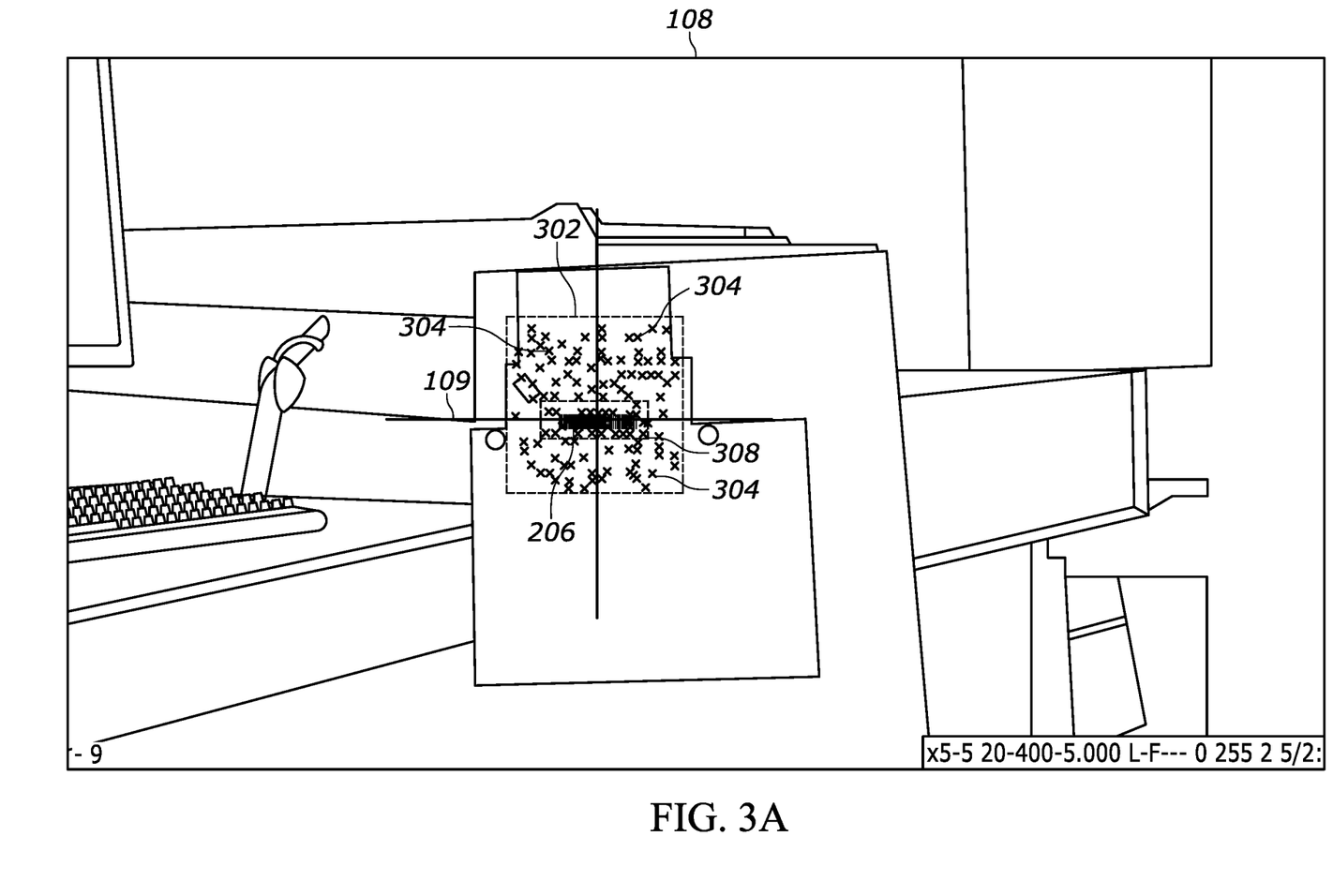
FIG. 3A illustrates an example search region within a field of view (FOV) of an imaging device that has a reduced search region size and an increased search seed density relative to the example prior art search region of FIG. 2A, in accordance with various embodiments of the present invention.

In any event, the devices and methods of the present invention may improve over these prior art methods by adjusting a search region by, for example, decreasing the search region size and increasing the search seed density within the search region based on the distance calculator 123 calculating a distance between the imaging device and the indicia. To illustrate, FIG. 3A provides an example search region 302 within the FOV 108 of an imaging device (e.g., imaging device 100) that has a reduced search region size and an increased search seed density relative to the example prior art search region 202 of FIG. 2A, in accordance with various embodiments of the present invention. The example search region 302 may be decreased in size relative to the example search region 202 by a predetermined amount (e.g., reduced in size by a fixed percentage or other amount), but it should be understood that the search region generator 122 may actively determine the reduced dimensions of the example search region 302 in real-time based on the distance between the imaging device and the indicia calculated by the distance calculator 123. This decreased size of the example search region 302 and/or increased search seed density relative to the example prior art search region 202 increases the overall likelihood of successful detection/decoding of the truncated indicia 206 relative to prior art systems, thereby decreasing the amount of wasted and/or otherwise expended processing time and resources attempting to decode indicia within captured images.

As an example, if no search seeds generated by the search region generator 122 included image data sufficient to decode the indicia 206, then the imaging device 100 may capture a subsequent image featuring the indicia 206, and the distance calculator 123 may determine a new distance between the imaging device 100 and the indicia 206. If the imaging device 100 determines, based on the new distance, that the device 100 is further from the indicia than in the prior image, then the generator 122 may adjust the search region by decreasing the size of the search region by a significant amount (e.g., to example search region 302) to focus primarily on the region surrounding the center of the aiming indicator 109.

More specifically, the search region generator 122 may automatically adjust the size and search seed density of the search region based on the new distance between the imaging device 100 and indicia 206 calculated by the distance calculator 123, as well as a presumption that the operator has positioned the center of the aiming indicator 109 over the truncated indicia 206. Additionally, the search region generator 122 may decrease the dimensions of the search region 302 when the distance calculator 123 determines that the target object featuring the truncated indicia 206 is at a relatively larger distance from the imaging device 100 than in a prior image. As a result, the example search region 302 is relatively smaller than the example prior art search region 202 because the imaging device 100 has intelligently/actively sized the search region 302 and the corresponding search seed density based on the distance between the imaging device 100 and the indicia 206.

As an example, assume that the example prior art search region 202 has dimensions of 100 pixels by 100 pixels and a search seed density of 1 search seed per 10 pixels as the result of a standardized search region size and search seed density generated after each image capture of a prior art imaging device, regardless of the distance between the prior art imaging device and the indicia. Accordingly, when the prior art imaging device analyzes the example prior art search region 202, the prior art device is substantially unlikely to successfully detect/decode the indicia 206. By contrast, the imaging device 100 of FIG. 1 may capture an image representative of the FOV 108, the distance calculator 123 may determine a distance between the imaging device 100 and the target object containing the indicia 206, and the search region generator 122 may generate the search region 302 over the image represented by the FOV 108 with dimensions of 50 pixels by 50 pixels. The search region generator 122 may also populate the example search region 302 with the search seeds 304 at a search seed density of 1 search seed per 3 pixels, and as a result, the indicia decoder 114 has a significantly increased likelihood of successfully detecting/decoding the indicia 206 because the search region 302 and search seed density are intelligently/actively determined based on the distance from the imaging device 100 to the target object featuring the indicia 206.

However, in some aspects, the search region generator 122 may also adjust the search region 302 by increasing the size of the search region 302 in response to the distance calculator 123 determining that the imaging device is at a relatively shorter distance from the target object than in a prior image capture, such that the truncated indicia 206 occupies a relatively larger portion of the subsequently captured image. Moreover, when the search region generator 122 increases the size of the search region 302, the generator 122 may also decrease the search seed density within the search region 302 to minimize the amount of processing time required to decode such a large indicia. Extra search seeds for such a large indicia may not create an increased likelihood that the indicia decoder 114 successfully decodes the indicia, as the indicia may be not decodable for other reasons unrelated to search seed density (e.g., blurriness, indicia degradation, etc.). Thus, decreasing the search seed density in such a scenario may optimize the processing time required to either decode the indicia or determine that the indicia is simply not decodable.

In this manner, the search region generator 122 may determine an optimal size of and/or search seed density within the search region 302 in order to detect and/or decode the indicia 206 present within the captured image, regardless of whether the target object is far from the imaging device 100 or very close to the imaging device. As previously mentioned, each search seed represents a set of image data to be analyzed, and as a result, each seed generated by the search region generator 122 represents additional processing time for the imaging device 100. Decreasing the size of the search region 302 and simultaneously increasing the search seed density for distant, difficult-to-detect indicia increases the overall likelihood of successful detection and decoding, thereby avoiding subsequent image captures and additional wasted processing time. Increasing the size of the search region 302 and simultaneously decreasing the search seed density for close, easy-to-detect indicia increases processing efficiency by avoiding analysis of unnecessary search seeds. Thus, the search region generator 122 may maximize processing efficiency and the likelihood of successful indicia detection/decoding regardless of whether the target object featuring the indicia is relatively far or near to the imaging device 100.

Regardless, the example search region 302 may include a random arrangement of search seeds 304, as generated by the search region generator 122 of FIG. 1. When the search region generator 122 has generated the search seeds 304, the imaging device 100 may analyze image data associated with each/some of the search seeds 304 in order to detect and/or decode the truncated indicia 206. As previously mentioned, the image captured by the imaging device 100 (e.g., imaging assembly 106) may be a grayscale image, such that the image data included in the regions represented by the search seeds 304 may include grayscale values. Thus, the imaging device 100 may analyze the grayscale values of the regions represented by the search seeds 304 to determine whether or not any of the regions of the image represented by the search seeds 304 include all or a portion of the truncated indicia 206.

Moreover, the image captured by the imaging assembly 106 may be a grayscale image, and the indicia decoder 114 may include a decoding algorithm (e.g., an edge detection algorithm) configured to analyze the grayscale image data to determine the presence of and/or decode the truncated indicia 206. The indicia decoder 114 may receive the grayscale image, and may utilize the grayscale image data included in the search seeds 304 to attempt to detect, for example, edges that are indicative of the truncated indicia 206. If the indicia decoder 114 is able to detect one or more edges that are indicative of the truncated indicia 206, the decoder 114 may also proceed to attempt to decode the truncated indicia 206 based on the grayscale image data.

As previously mentioned, the truncated indicia 206 may have a portion of the top, bottom, sides, middle, and/or any other suitable portion of the indicia 206 blocked and/or otherwise obscured within the FOV 108, and as a result, the region occupied by the indicia 206 within the FOV 108 may be relatively small. However, the truncated indicia 206 poses less of a problem within the example search region 302, relative to the example prior art search region 202, because the number of search seeds 304 and the overall density of the search seeds 304 provides a higher likelihood of detection and decoding of the truncated indicia 206 relative to the example prior art search region 202. In particular, a central search region portion 308 that includes the truncated indicia 206 illustrates how the information available to the imaging device 100 within the central search region portion 308 may be substantially increased relative to the central search region portion 208, thereby providing the indicia decoder 114 a much higher likelihood of a successful detection and decoding of the truncated indicia 206.

Figure 3B:
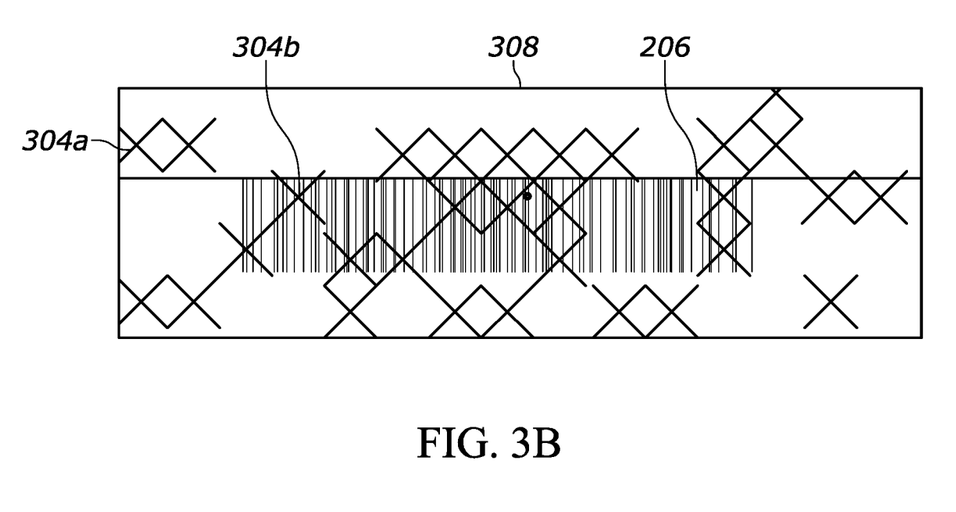
FIG. 3B illustrates a portion of the example search region of FIG. 3A that is centered on the indicia, in accordance with various embodiments of the present invention.

FIG. 3B illustrates the central search region portion 308 in greater detail, and shows how many of the search seeds 304 are located on the truncated indicia 206. In fact, a significant number of the search seeds 304 were placed on the truncated indicia 206 by the search region generator 122, but the non-indicia seeds (referenced collectively as 304a) still do not provide useable information to the indicia decoder 114 in order to detect or decode the truncated indicia 206. Nevertheless, the indicia seeds (referenced collectively as 304b) may provide enough useful image data corresponding to the truncated indicia 206, that the useful image data derived from the indicia seeds 304b may be sufficient to accurately detect and decode the truncated indicia 206.

Figure 4:
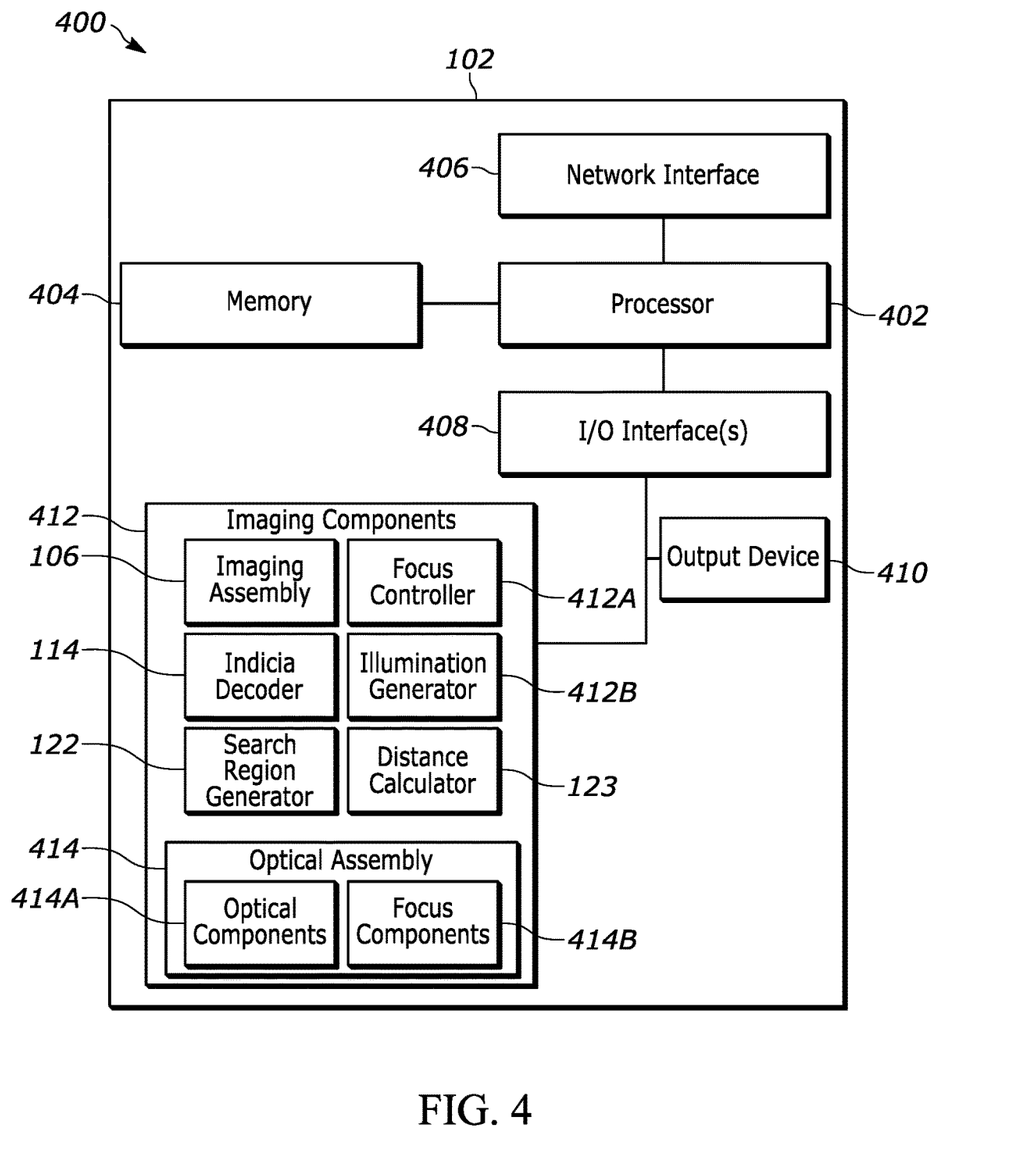
FIG. 4 is a block diagram representative of an example logic circuit for implementing the example imaging device of FIG. 1, in accordance with embodiments described herein.

In order to perform these functions described in reference to FIGS. 1, 3A, and 3B, the imaging device 100 may include multiple components in addition to those previously described that are configured to interact with and/or execute the various components described in, for example, FIG. 1. In particular, FIG. 4 is a block diagram representative of an example logic circuit capable of implementing, for example, the example imaging device 100 of FIG. 1. The example logic circuit of FIG. 4 is a processing platform 400 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 400 of FIG. 4 includes a processor 402 such as, for example, one or more microprocessors, controllers, and/or any suitable type of processor. The example processing platform 400 of FIG. 4 includes memory (e.g., volatile memory, non-volatile memory) 404 accessible by the processor 402 (e.g., via a memory controller). The example processor 402 interacts with the memory 404 to obtain, for example, machine-readable instructions stored in the memory 404 corresponding to, for example, the operations represented by the flowchart(s) of this disclosure. Additionally, or alternatively, machine-readable instructions corresponding to the example operations described herein may be stored on one or more removable media (e.g., a compact disc (CD), a digital versatile disc (DVD), removable flash memory, etc.) that may be coupled to the processing platform 400 to provide access to the machine-readable instructions stored thereon. The processor 402 and the memory 404 are disposed in the housing 102.

The example processing platform 400 of FIG. 4 includes one or more communication interfaces such as, for example, one or more network interfaces 406, and/or one or more input/output (I/O) interfaces 408 disposed in the housing 102. The communication interface(s) may enable the processing platform 400 of FIG. 4 to communicate with, for example, another device, system, host system (e.g., an inventory management system, a POS station, etc.), datastore, database, and/or any other machine.

The example processing platform 400 of FIG. 4 may include the network interface(s) 406 to enable communication with other machines (e.g., an inventory management system, a POS station, etc.) via, for example, one or more networks. The example network interface(s) 406 include any suitable type of communication interface(s) (e.g., wired and/or wireless interfaces) configured to operate in accordance with any suitable communication protocol(s). Example network interfaces 406 include a TCP/IP interface, a Wi-Fi™ transceiver (e.g., according to the IEEE 802.11x family of standards), an Ethernet transceiver, a cellular network radio, a satellite network radio, or any other suitable interface based on any other suitable communication protocols or standards.

The example, processing platform 400 of FIG. 4 may include the input/output (I/O) interface(s) 408 (e.g., a Bluetooth® interface, a near-field communication (NFC) interface, a universal serial bus (USB) interface, a serial interface, an infrared interface, etc.) to (1) enable receipt of user input (e.g., from the trigger 120 of FIG. 1, a touch screen, keyboard, mouse, touch pad, joystick, trackball, microphone, button, etc.), (2) communicate output data (e.g., mode change confirmations, visual indicators, instructions, data, images, etc.) to the user (e.g., via an output device 410, speaker, printer, haptic device, etc.), and/or (3) interact with other components of the processing platform 400 (e.g., a set of imaging components 412, the output device 410, etc.). Example output devices 410 may include a sound generation device, a haptic device, or the like.

To capture images of objects and/or barcodes on objects, the example processing platform 400 includes the set of imaging components 412 disposed in the housing. The set of imaging components 412 includes the imaging assembly 106 under control of, for example, the processor 402 to capture image frames representative of the portion of an environment in which the example imaging device 100 is operating that falls within the imaging FOV 108 of the set of imaging components 412. The imaging assembly 106 includes a plurality of photosensitive elements forming a substantially flat surface. The processor 402 may be communicatively coupled to the set of imaging components 412 via the input/output (I/O) interface(s) 408.

The example set of imaging components 412 includes any number and/or type(s) indicia decoders 114 (e.g., the indicia decoder 114) to detect and/or decode indicia to determine the payload of the indicia. In some aspects, the indicia decoder 114 is implemented by the processor 402. The indicia decoder 114, e.g., via the processor 402, conveys the payload of decoded indicia to a host system via a communication interface such as the network interface(s) 406 and/or the I/O interface(s) 408.

The example set of imaging components 412 includes an optical assembly 414 to form images of objects in the FOV 108 on the surface of the imaging assembly 106. The optical assembly 414 may include any number and/or type(s) of optical elements and/or components 414A including, for example, one or more lenses, filters, focus motors, apertures, lens holder, liquid lenses, or any other components and/or optical elements. Moreover, to focus the set of imaging components 412 on an object, the example set of imaging components 412 may include a focus controller 412A, and the optical assembly 414 may include any number and/or type(s) of focus components 414B (e.g., motors, liquid lenses, etc.). In some aspects, the focus controller 412A is implemented by the processor 402. In certain aspects, the example set of imaging components 412 is a fixed-focus scanner.

To illuminate a target to be imaged, the example set of imaging components 412 may include the illumination generator 412B. The illumination generator 412B may emit light in the FOV 108 to, for example, facilitate autofocusing and/or improve the quality of image frames captured by the imaging assembly 106.

Further, the set of imaging components 412 may include the search region generator 122 and the distance calculator 123. As previously described, the search region generator 122 may be configured to generate a search region (e.g., example search regions 202, 302) within an image captured by the imaging assembly 106, and to populate the search region with search seeds (e.g., search seeds 204, 304) that each represent areas within the captured image that may contain image data corresponding to an indicia (e.g., truncated indicia 206). The distance calculator 123 may generally calculate a distance value (e.g., in centimeters, meters, inches, feet, etc.) indicating the distance between the imaging device (e.g., imaging device 100) and a target object that features an indicia for each new image captured by the imaging device. As previously discussed, the distance calculator 123 may calculate the distance value in any suitable manner, such as, for example, by a parallax calculation based on known dimensions of an indicia, time of flight of a light pulse or other suitable signal, and/or any other suitable method(s) or combinations thereof. In any event, both the search region generator 122 and the distance calculator 123 may be or include instructions that are executable by the processor 402 in order to perform the corresponding functions.

Figure 5:
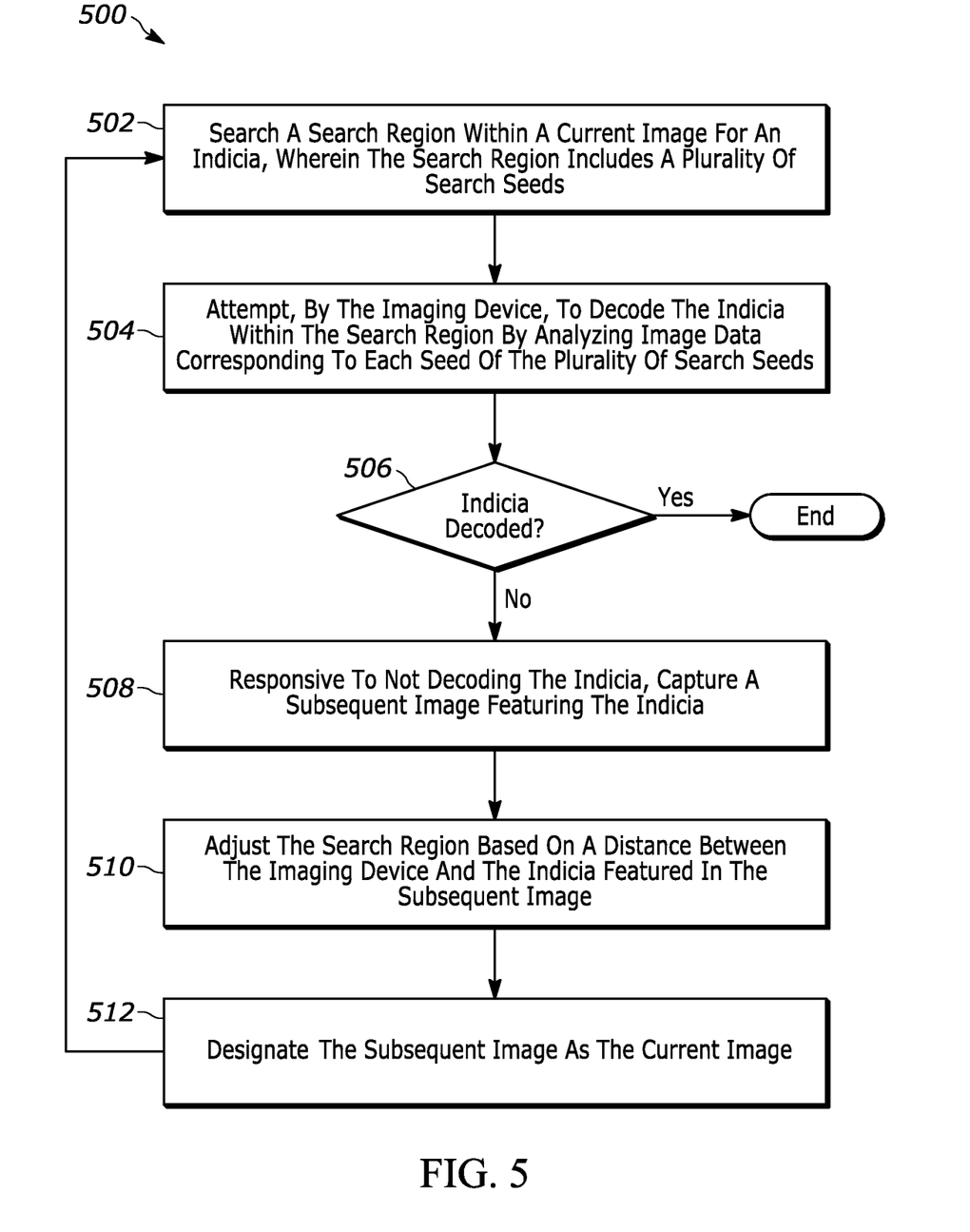
FIG. 5 illustrates a method for improving indicia decoding with an imaging device, in accordance with various embodiments of the present invention.

FIG. 5 illustrates an example method 500 for improving indicia decoding with an imaging device, in accordance with various embodiments of the present invention. It should be understood that, in certain embodiments, any of the blocks of the method 500 may be performed by any of the example imaging device 100, the imaging assembly 106, the indicia decoder 114, the search region generator 122, the distance calculator 123, the processor(s) 202, and/or any other suitable device.

The method 500 includes searching, by an imaging device, a search region within a current image for an indicia (block 502). The search region (e.g., search regions 202, 302) may include a plurality of search seeds (e.g., search seeds 204, 304). In certain aspects, a center of an aiming indicator (e.g., aiming indicator 109) is disposed in a center of the search region and the indicia is presumed to be at the center of the aiming indicator.

Further, in some aspects, each seed of the plurality of search seeds is randomly placed within the search region. For example, the search region generator 122 may randomly place each seed of the plurality of search seeds within the search region. However, as part of this randomized placement, the search seed generator 122 may still apply certain placement criteria when placing the search seeds. Namely, the search seed generator 122 may not place multiple search seeds over a single location within the search region. Two search seeds may touch (e.g., share a common border), but in general, each individual search seed may include a unique location or set of locations (e.g., pixels) within the captured image featuring the indicia. In this manner, the indicia decoder 114 may attempt to detect and/or decode the indicia without analyzing duplicitous image data, and thereby saving processing resources and time.

The method 500 also includes attempting, by the imaging device, to decode the indicia within the search region by analyzing image data corresponding to each seed of the plurality of search seeds (block 504). In certain aspects, the indicia is a barcode, and the method 500 further includes attempting to decode the barcode within the search region by applying a decoding algorithm to the image data from each seed. In these aspects, the image data located within the barcode includes vertical lines of the barcode, which enables the indicia decoder 114 to distinguish the characteristic features of the barcode. Thus, the indicia decoder 114 may analyze the image data from the search seeds placed on the barcode using the decoding algorithm to detect the barcode, and may also proceed to decode the barcode once it has been identified. In particular, the decoding algorithm may be an edge detection algorithm. Additionally, or alternatively, the indicia may be any one-dimensional indicia (e.g., a barcode) a two-dimensional indicia (e.g., a quick response (QR) code) and/or any other suitable indicia or combinations thereof. Moreover, the decoding algorithm may be any suitable algorithm for decoding any of the suitable indicia, such as a decoding algorithm configured to identify specifically arranged blocks of a matrix barcode, and/or any other suitable algorithm or combinations thereof.

In any event, the method 500 further includes determining whether or not the indicia was successfully decoded (block 506). If the indicia was successfully decoded (YES branch of block 506), then the method 500 may terminate. However, if the indicia was not successfully decoded (NO branch of block 506), then the method 500 may proceed to block 508, where the imaging device may capture a subsequent image featuring the indicia. In particular, the method 500 may further include, responsive to not decoding the indicia, capturing a subsequent image featuring the indicia (block 508). For example, the indicia decoder 114 may analyze image data from each of the plurality of search seeds, and may be unable to detect and/or decode the indicia. As a result, the indicia decoder 114 may transmit a signal to the imaging assembly 106 that the detection/decoding of the indicia was unsuccessful. In response, the imaging assembly 106 may automatically capture a subsequent image of the target object featuring the indicia. A user/operator may inadvertently and/or intentionally move the imaging device between the first image capture and the subsequent image capture, so the imaging device may proceed to determine a new distance between the device and the target object in order to determine a new search region.

Namely, the method 500 also includes, adjusting, by the imaging device, the search region based on a distance between the imaging device and the indicia (block 510). For example, after the imaging assembly 106 captures the subsequent image, the imaging assembly 106 may transmit a signal to the distance calculator 123 indicating that the distance between the imaging device and the indicia featured in the subsequent image should be calculated in order to determine the search region within the subsequent image. In response, the distance calculator 123 may proceed to calculate the distance between the imaging device and the indicia within the subsequent image, and may transmit the distance to the search region generator 122. Upon receipt of the distance, the search region generator 122 may adjust (e.g., decrease/increase) the dimensions of the search region and/or adjust the number of search seeds populated within the adjusted search region relative to the prior search region based on the distance between the imaging device and the indicia calculated by the distance calculator 123.

In certain aspects, and as previously described, adjusting the search region further includes reducing and/or increasing an area of the search region based on the distance between the imaging device and the indicia. Moreover, in some aspects, adjusting the search region further includes increasing and/or decreasing a number of search seeds within the search region based on the distance between the imaging device and the indicia.

Of course, it should be understood that the search region size and/or search seed density of a subsequent search region corresponding to a subsequent image may not be based on the search region size and/or search seed density of a prior search region of a prior image. The distance calculator 123 and search region generator 122 may operate to determine the search region size and search seed density purely as a function of the distance between the imaging device and the indicia featured in the respective image, without comparing relative distances, search region sizes, search seed densities, and/or any other metrics between images. Thus, any description of a particular search region as relatively smaller/larger and/or a particular search seed density as relatively smaller/larger than another respective search region size or search seed density may not be the result of a comparison actively performed by any of the components referenced herein, but may simply be the result of a change in the distance of the imaging device from the indicia between subsequent image captures.

Regardless, when the distance calculator 123 and search region generator 122 have adjusted the search region for the subsequent image, the method 500 may proceed to block 512, where the subsequent image is designated as the current image. More specifically, the imaging device may designate the subsequent image as the current image in order to perform the actions associated with at least blocks 502-506 again with respect to the subsequent image. Accordingly, the method 500 may return to block 502, where the imaging device may proceed to search the search region within the subsequent image (e.g., the newly designated current image) for the indicia.

The method 500 may further include iteratively performing the actions of blocks 502-512 until the imaging device decodes the indicia. Generally, the imaging device 100 may perform the actions of blocks 502-512 as many times as is necessary to successfully detect and decode the indicia. For example, the imaging device 100 may search the search region for the indicia, attempt to decode the indicia, and responsive to not decoding the indicia, capture a subsequent image, adjust the search region, and designate the subsequent image as the current image 2, 3, 4, 5, and/or any other suitable number of times in order to successfully detect and decode the indicia. However, in certain instances, the imaging device 100 may be configured to stop iteratively performing the actions of block 502-512 when a certain threshold is reached indicating that the indicia simply may not be successfully detected/decoded from the captured image, and that a new captured image may be required.

To illustrate, and in certain aspects, after each iteration, the imaging device 100 may increase an iteration index. In these aspects, the method 500 may include iteratively performing the actions of blocks 502-508 until the imaging device 100 decodes the indicia or the imaging device 100 determines that the iteration index exceeds an iteration index threshold. Moreover, responsive to the imaging device 100 determining that the iteration index exceeds the iteration index threshold, the imaging device 100 may display (e.g., by output device 410) a message to a user requesting a subsequent image featuring the indicia. In response, an operator may capture a subsequent image featuring the indicia (e.g., at a shorter distance from the target object than the prior image), and the imaging device 100 may proceed to perform the actions of block 502-508 until either the indicia featured in the subsequent image is detected/decoded and/or the iteration index exceeds the iteration index threshold.

In some aspects, the method 500 may include iteratively performing the actions of block 502-512 until the imaging device decodes the indicia or at least one of (i) the imaging device determines that the iteration index exceeds an iteration index threshold, (ii) the imaging device determines that a decoding time corresponding to the current image exceeds a decoding time threshold, or (iii) the image data from each seed in the plurality of search seeds is analyzed without detecting the indicia. For example, the indicia decoder 114 may only have a pre-determined amount of time (e.g., decoding time threshold) in order to successfully detect/decode the indicia before the image is discarded. In this example, the decoding time threshold may be any suitable length of time, such as several milliseconds, several seconds, and/or any other suitable length of time. However, responsive to the imaging device determining that the decoding time exceeds the decoding time threshold, or the image data is analyzed without detecting the indicia, the method 500 may further include displaying, by the imaging device, a message to a user requesting another image featuring the indicia.

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application-specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for improving indicia decoding with an imaging device, the method comprising:
   (a) searching, by an imaging device, a search region within a current image for an indicia, wherein the search region includes a plurality of search seeds;
   (b) attempting, by the imaging device, to decode the indicia within the search region by analyzing image data corresponding to each seed of the plurality of search seeds;
   (c) responsive to not decoding the indicia, capturing, by the imaging device, a subsequent image featuring the indicia;
   (d) adjusting, by the imaging device, the search region based on a distance between the imaging device and the indicia featured in the subsequent image;
   (e) designating the subsequent image as the current image; and
   (f) iteratively performing (a)-(f) until the imaging device decodes the indicia.

2. The method of claim 1, wherein adjusting the search region further includes reducing or increasing an area of the search region based on the distance.

3. The method of claim 1, wherein adjusting the search region further includes increasing or decreasing a number of search seeds within the search region based on the distance.

4. The method of claim 1, wherein a center of an aiming indicator is disposed in a center of the search region and the indicia is presumed to be at the center of the aiming indicator.

5. The method of claim 1, wherein the indicia is a barcode, and the method further comprises:
   attempting to decode the barcode within the search region by applying a decoding algorithm to the image data from each seed.

6. The method of claim 1, wherein after each iteration, the imaging device increases an iteration index, and wherein the method further comprises:
   (f) iteratively performing (a)-(f) until the imaging device decodes the indicia or at least one of (i) the imaging device determines that the iteration index exceeds an iteration index threshold, (ii) the imaging device determines that a decoding time corresponding to the current image exceeds a decoding time threshold, or (iii) the image data from each seed in the plurality of search seeds is analyzed without detecting the indicia.

7. The method of claim 6, further comprising:
   responsive to the imaging device determining that the iteration index exceeds the iteration index threshold, the decoding time exceeds the decoding time threshold, or the image data is analyzed without detecting the indicia, displaying, by the imaging device, a message to a user requesting another image featuring the indicia.

8. The method of claim 1, wherein each seed of the plurality of search seeds is randomly placed within the search region.

9. An imaging device for improving indicia decoding, the device comprising:
   an imaging assembly configured to capture a current image featuring an indicia, the current image comprising a set of image data;
   one or more processors; and
   a non-transitory computer-readable memory coupled to the imaging assembly and the one or more processors, the memory storing instructions thereon that, when executed by the one or more processors, cause the one or more processors to:
   (a) search a search region within the image for the indicia, wherein the search region includes a plurality of search seeds, (b) attempt to decode the indicia within the search region by analyzing image data from the set of image data that corresponds to each seed of the plurality of search seeds, (c) responsive to not decoding the indicia, cause the imaging assembly to capture a subsequent image featuring the indicia, (d) adjust the search region based on a distance between the imaging device and the indicia featured in the subsequent image, (e) designate the subsequent image as the current image, and (f) iteratively perform (a)-(f) until the indicia is decoded.

10. The imaging device of claim 9, wherein the instructions, when executed by the one or more processors, further cause the one or more processors to:

adjust the search region by reducing or increasing an area of the search region based on the distance.

11. The imaging device of claim 9, wherein the instructions, when executed by the one or more processors, further cause the one or more processors to:

adjust the search region by increasing or decreasing a number of search seeds within the search region based on the distance.

12. The imaging device of claim 9, further comprising:

a distance calculator configured to calculate the distance between the imaging device and the indicia based on at least one of (i) an aiming indicator that is centered on the indicia or (ii) an emitted light pulse that propagates between the imaging device and the indicia.

13. The imaging device of claim 9, wherein the indicia is a barcode, and the instructions, when executed by the one or more processors, further cause the one or more processors to:

attempt to decode the barcode within the search region by applying a decoding algorithm to the image data corresponding to each seed.

14. The imaging device of claim 9, wherein after each iteration, the one or more processors increase an iteration index, and the instructions, when executed by the one or more processors, further cause the one or more processors to:

(f) iteratively perform (a)-(f) until the indicia is decoded or at least one of (i) the one or more processors determine that the iteration index exceeds an iteration index threshold, (ii) the one or more processors determine that a decoding time corresponding to the current image exceeds a decoding time threshold, or (iii) the image data from each seed in the plurality of search seeds is analyzed without detecting the indicia.

15. The imaging device of claim 14, wherein the instructions, when executed by the one or more processors, further cause the one or more processors to:

responsive to determining that the iteration index exceeds the iteration index threshold, the decoding time exceeds the decoding time threshold, or the image data is analyzed without detecting the indicia, display a message to a user requesting another image featuring the indicia.

16. A tangible machine-readable medium comprising instructions for improving indicia decoding, when executed, cause a machine to at least:

(a) search a search region within a current image for an indicia, wherein the search region includes a plurality of search seeds;

(b) attempt to decode the indicia within the search region by analyzing image data that corresponds to each seed of the plurality of search seeds;

(c) responsive to not decoding the indicia, capture a subsequent image featuring the indicia;

(d) adjust the search region based on a distance from the indicia featured in the subsequent image;

(e) designate the subsequent image as the current image; and (f) iteratively perform (a)-(f) until the indicia is decoded.

17. The tangible machine-readable medium of claim 16, wherein the instructions, when executed, further cause the machine to at least:

adjust search region by reducing or increasing an area of the search region based on the distance.

18. The tangible machine-readable medium of claim 16, wherein the instructions, when executed, further cause the machine to at least:

adjust the search region by increasing or decreasing a number of search seeds within the search region based on the distance.

19. The tangible machine-readable medium of claim 16, wherein the indicia is a barcode, and the instructions, when executed, further cause the machine to at least:

attempt to decode the barcode within the search region by applying a decoding algorithm to the image data corresponding to each seed.

20. The tangible machine-readable medium of claim 16, wherein after each iteration, the instructions, when executed, further cause the machine to at least increase an iteration index, and:

(f) iteratively perform (a)-(f) until the indicia is decoded or at least one of (i) the iteration index exceeds an iteration index threshold, (ii) a decoding time corresponding to the current image exceeds a decoding time threshold, or (iii) the image data from each seed in the plurality of search seeds is analyzed without detecting the indicia; and responsive to determining that the iteration index exceeds the iteration index threshold, the decoding time exceeds the decoding time threshold, or the image data is analyzed without detecting the indicia, display a message to a user requesting another image featuring the indicia.

\* \* \* \* \*